(12) United States Patent
Held (10) Patent No.: US 8,303,020 B1
(45) Date of Patent: Nov. 6, 2012

(54) CLUB PROTECTOR

(76) Inventor: Michael P. Held, Orchard Park, NY (US)

( * ) Notice: Subject to any disclaimer, the term of this patent is extended or adjusted under 35 U.S.C. 154(b) by 181 days.

(21) Appl. No.: 12/836,160

(22) Filed: Jul. 14, 2010

Related U.S. Application Data (60) Provisional application No. 61/225,683, filed on Jul. 15, 2009.

(51) Int. Cl.
*B60P 7/04* (2006.01)

(52) U.S. Cl. .................................. 296/100.14; 296/99.1

(58) Field of Classification Search .................. 296/99.1, 296/100.14, 98
See application file for complete search history.

(56) References Cited

U.S. PATENT DOCUMENTS

| | | | |
|---|---|---|---|
| 6,761,391 B2 | 7/2004 | Winkler | |
| 7,100,662 B2 | 9/2006 | Nation | |
| 7,823,956 B2 * | 11/2010 | Jones et al. | 296/100.06 |
| 2008/0174143 A1 * | 7/2008 | Showalter | 296/100.14 |

\* cited by examiner

*Primary Examiner* — Dennis Pedder
(74) *Attorney, Agent, or Firm* — Patricia M. Costanzo (57) ABSTRACT

An enclosure assembly (20) for enclosing a cargo compartment of an open-air cart having a cap (30) shaped to mate with a rear section of a roof (200) of a cart for the secure fitting of cap (30) over the rear section of the roof of the cart, brackets (40) attachable to the cart using the cart's existing structure, and a cover (25) one edge of which is to be attached to cap (30) and its side portions to brackets (40), so when cover (25) is attached to cap (30) and brackets (40), assembly (20) is formed and ready for installation on the cart. Installation is achieved when cap (30) is positioned over the rear section of the roof and brackets (40) are attached to the cart using only attachments that exist on the cart, providing for a two-step installation without altering or drilling any holes in the cart.

16 Claims, 8 Drawing Sheets

CLUB PROTECTOR

CROSS-REFERENCE TO RELATED APPLICATIONS

This Non-Provisional application for patent claims the benefit of Provisional Application No. 61/225,683 filed Jul. 15, 2009.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to enclosures for open-air car cargo compartments and, more particularly, to an enclosure assembly that provides enhanced protection from the effects of inclement weather on cargo, such as the golf-clubs and golf-club bags that are carried in the cargo compartment of a golf-cart.

The background information discussed below is presented to better illustrate the novelty and usefulness of the present invention. This background information is not admitted prior art.

Originally gas-powered open-air cars, once intended mainly for use on the golf course, are now generally electric powered and mass-produced for use by both golfers and private consumers. Originally designed to carry two people and their golf clubs around a golf course, the cars are now widely available in a wide range of styles and are used to convey from two up to ten, and occasionally more, passengers.

The use of open-air carts on the golf course is now nearly ubiquitous. Golf carts provide for golfers, along with all their accessory equipment, to get to the next hole with a minimum of physical exertion. Accessories include additional clubs, tees, golf balls, beverages, sand bottles, ball cleaners, cooler trays, upgraded motor or speed controller, and lift kits. Most carts come with storage space devoted to specific cargo. For example, golf-bag wells are provided in the rear of golf-carts for the golf-bags that are used to hold the golf clubs. General use open cars often come with a baggage rack that is also designed to support a baggage-box for general transporting purposes.

Open-air cars now typically come with a roof and a windshield panel. Side enclosures protect the occupants of the car from the elements, including wind, cold, snow, and rain. Enclosures generally consist of panels that hang from the cart roof. Two-seater open-car enclosures include from between two and four enclosure-panels. For example, there could be a panel for each side of the cart, and one for the back of the cart. If the cart does not come with a windshield, then there may be a front panel, as well. The top portion of each enclosure panel is generally made from a transparent material, while the bottom portion is made from a durable opaque material, so that when the enclosure is deployed to protect the occupants of the car from adverse weather effects, the occupants have good visibility. Most golf carts now also provide some shelter from rain for the items that are carried in the golf bag well or in the storage space.

SUMMARY

The present Inventor recognized that among the many cargo compartment enclosures that have been attempted, there is no cargo compartment enclosure that provides the level of protection he felt should be provided. Additionally, currently available golf-cart club-bag enclosures are complex making installation an involved procedure and because of their flat-top design, current devices allow water to collect on the top of the enclosure. Moreover, the current Inventor realized that available enclosures leave gaps, especially on the side sections allowing rain to enter the enclosed space. While testing some of the currently available cover design, the present Inventor became aware that they cannot accommodate the increase in length of the newer golf clubs and thus, compromise the storage space beneath the cover. In addition, the present Inventor wanted to avoid modifying or altering his golf cart, by drilling into the body or the supports of the cart, which is required by the presently available covers in order to secure the cover to the cart. The present Inventor felt that this type of installation is not only difficult, but that it could also affect the aesthetic appearance of the golf cart.

Accordingly, the present Inventor set about to develop a golf-club and golf-club bag protector assembly that provides enhanced protection for the contents of the golf-bag holder compartment that he wanted, has an easy to use folding canopy, is easily, rapidly, and securely appended to the cart without requiring any modifications or alterations to the cart, provides a water draining sloping cover, the height required by today's longer clubs and for other accessories to be mounted under and/or next to the cover, and is constructed in a user-friendly design.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF THE REFERENCE CHARACTERS AND PARTS TO WHICH THEY REFER

12 A moveable frame arm.
14 Another moveable frame arm.
16 Sleeve for supporting frame arm 12.
20 A golf-cart bag cover assembly made according to the principles of the present invention.
25 Cover.
30 A molded cap to which cover 20 is detachably attached.
32 Rib cap supports.
33 Bolts for securing track bar 36 onto molded cap 30.
34 Attachment clips.
35 Flat top part of molded cap.
36 A track bar, tubular, awning holding fixture.
40 Brackets to which frame arms are rotatably attached.
42 A bolt to secure moveable arms to brackets 40.
44 An aperture for bolt 42.
45 An aperture for bolt 245.
200 Roof of a cart.
210 Cart roof support frame.
220 Accessory.
230 Standard golf-cart bag carrier-rack.
235 Section of standard golf-cart bag carrier-rack.
245 A bolt of the golf-cart/golf bag structure.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms, which is understandable given the variations of various styles of golf-carts. Moreover, many carts are now made and/or used for general transport. Many of these carts have cargo compartments analogous to a golf-cart's golf-bag storage compartment and with which the present invention may be utilized. Therefore, the embodiments described herein are provided with the understanding that the present disclosure is intended as illustrative and is not intended to limit the invention to the embodiments described herein.

The principles of the present invention are directed towards an enclosure assembly for a cargo compartment of any open-air car where the assembly is structured for a two-step, non-invasive, installation to the cart. The drawings illustrate an assembly that is directed specifically toward an enclosure on a golf-cart golf-bag enclosure. The principles of the present invention ensure that the assembly, regardless of its specific use, is easily and quickly installed on the back side of a cart to provide protection for the back cargo compartment of the cart, which is typically where a golf-bag holder is situated. The golf-cart cargo enclosure assembly illustrated includes a cap that is molded to snugly fit over the rear portion of a golf-cart's roof structure. Attached to the cap is a flexible, cloth-like cover that provides protection from the element. The flexible protective cover is supported and given form by, in this example, two moveable U-shaped frame arms. A set of brackets, one of which is attached to a first end of the U-shaped frame arms, and another bracket attached to a second end of the U-shaped using a friction hinge bolt attachment. The friction hinges provide the pivot point about which each of the moveable frame arms is easily opened and closed. The mid-portion of the cloth-like, flexible, protective cover is supported by one of the moveable U-shaped frame arms; the other U-shaped frame arm is attached to the bottom edge of the cover, while the top edge of the cover is detachably attached to, and supported by, the molded-cap. Thus, once the molded cap is easily, rapidly, and securely clipped onto the rear end portion of the golf-cart's roof structure and the brackets are attached to the cart using pre-existing bolts and bolt holes, the assembly is ready for use. The moveable frame arms provide for the cover to be opened, by lifting the arms and cover upwards, and closed by bring the arms and cover downwards.

Figure 1:
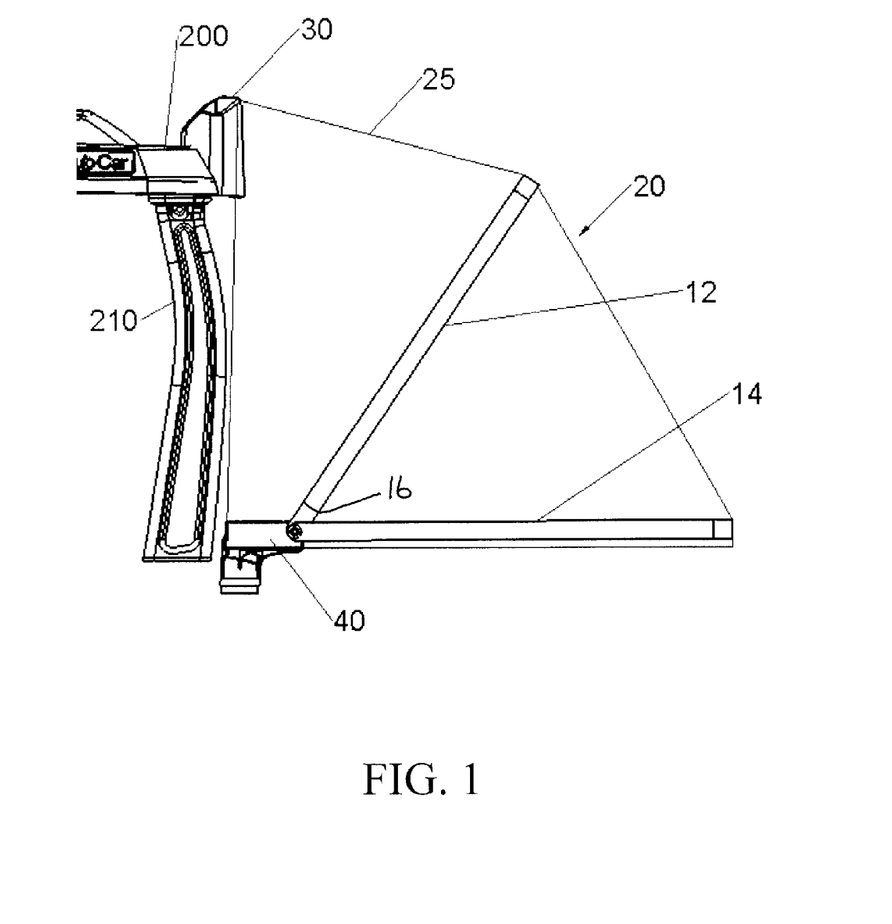
FIG. 1 is a perspective side view of a golf-cart cover of the present invention.

FIG. 1, a perspective "see-through" view, illustrates one example of a golf-cart cover assembly made according to the principles of the present invention. Golf-cart cover assembly 20 is shown installed on a golf-cart equipped with standard roof 200 supported by standard roof supports 210. Golf-cart cover assembly 20 consists of molded cap 30, moveable arms 12 and 14 (which can be seen due to the see-through nature of cover 25 in the illustration), mirror-image brackets 40, and cover 25. Attaching golf-cart cover assembly 20 to the golf-cart requires only two simple steps. The first step is to place molded cap 30 over the rear part of the cart's roof. Molded cap 30 is molded to exactly conform to the shape of the rear section of roof 200 of a given cart providing for the molded cap to be placed over the rear section of a given roof to be simply, easily, quickly, and securely snapped into place. The shape of the interior surface of each molded cap can be likened to a mold while the rear section of the roof over which the molded cap fits can be likened to a cast made from the mold, thus assuring a secure and confident fit of the molded cap on the rear section of the roof. The second step is the attachment of brackets 40 to the cart. It is important to note that neither of these two installation steps requires any holes to be drilled or any other alteration to be made to the cart. Each bracket 40 is attached to the cart using a bolt (and bolt aperture) that is already in place securing the cart's golf-bag holder within the cargo compartment of the cart. This completes the installation of the assembly 20. Golf-cart cover assembly 20 is provided with moveable frame arms 12 and 14 pivotably attached to brackets 40. The form of flexible cloth-like cover 25 is provided by the two moveable frame arms 12 and 14. Moveable frame arms 12 and 14 are attached to the underside of the cover, in this example, by inserting the arms into the sleeves 16 that are sewn to the underside of the cover for the purpose of holding frame arms 12 and 14. The top of molded cap 30 extends a sufficient distance above the top surface of the cart's roof 200 to provide room for today's longer golf-clubs to be placed upright in their golf bag and be comfortably accommodated with the covered rear storage (bag holder) compartment. The downward slope of the top of molded cap 30 and that part of cover 25 that is directly attached to molded cap 30 provides for water to drain off of the cover instead of puddling on the top of the installed cover as it does when it rains on currently available covers.

Figure 2A:
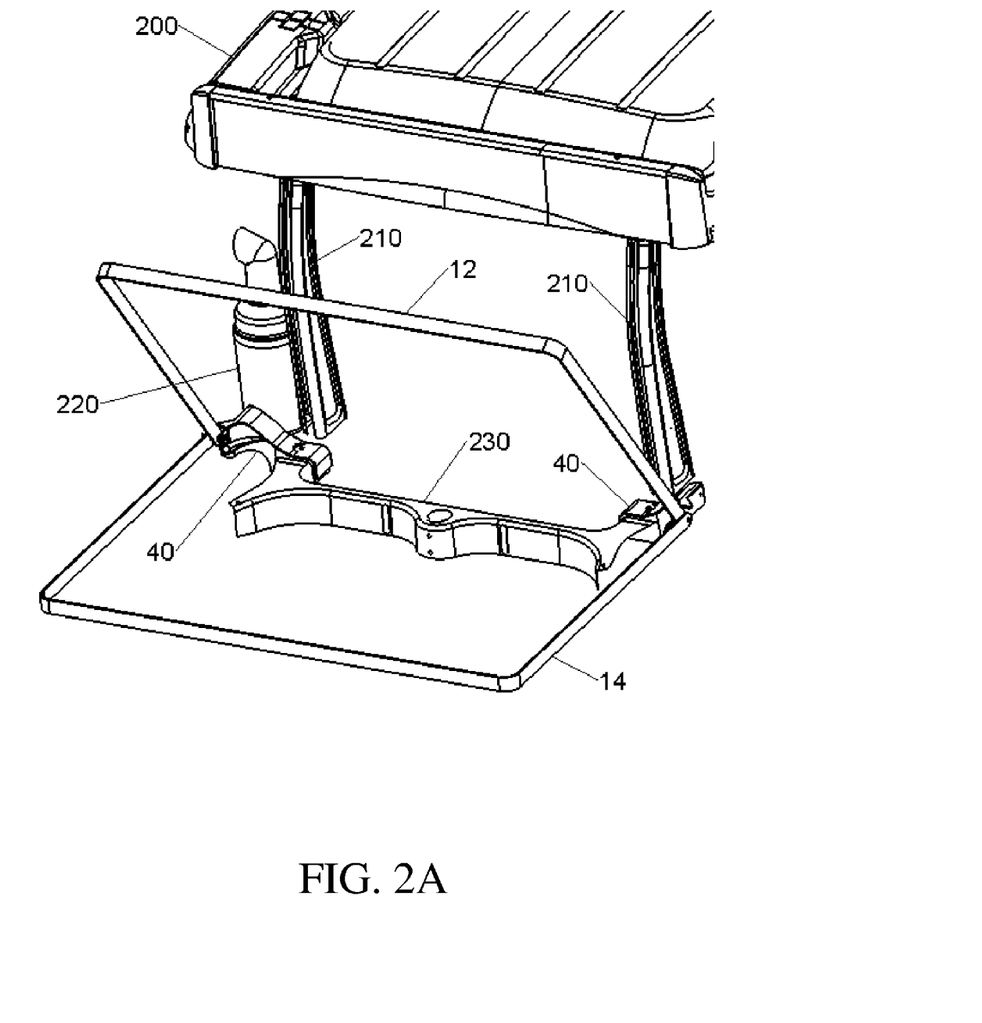
FIG. 2A is a perspective view of a golf-cart frame securely attached on a golf-cart.
Figure 2B:
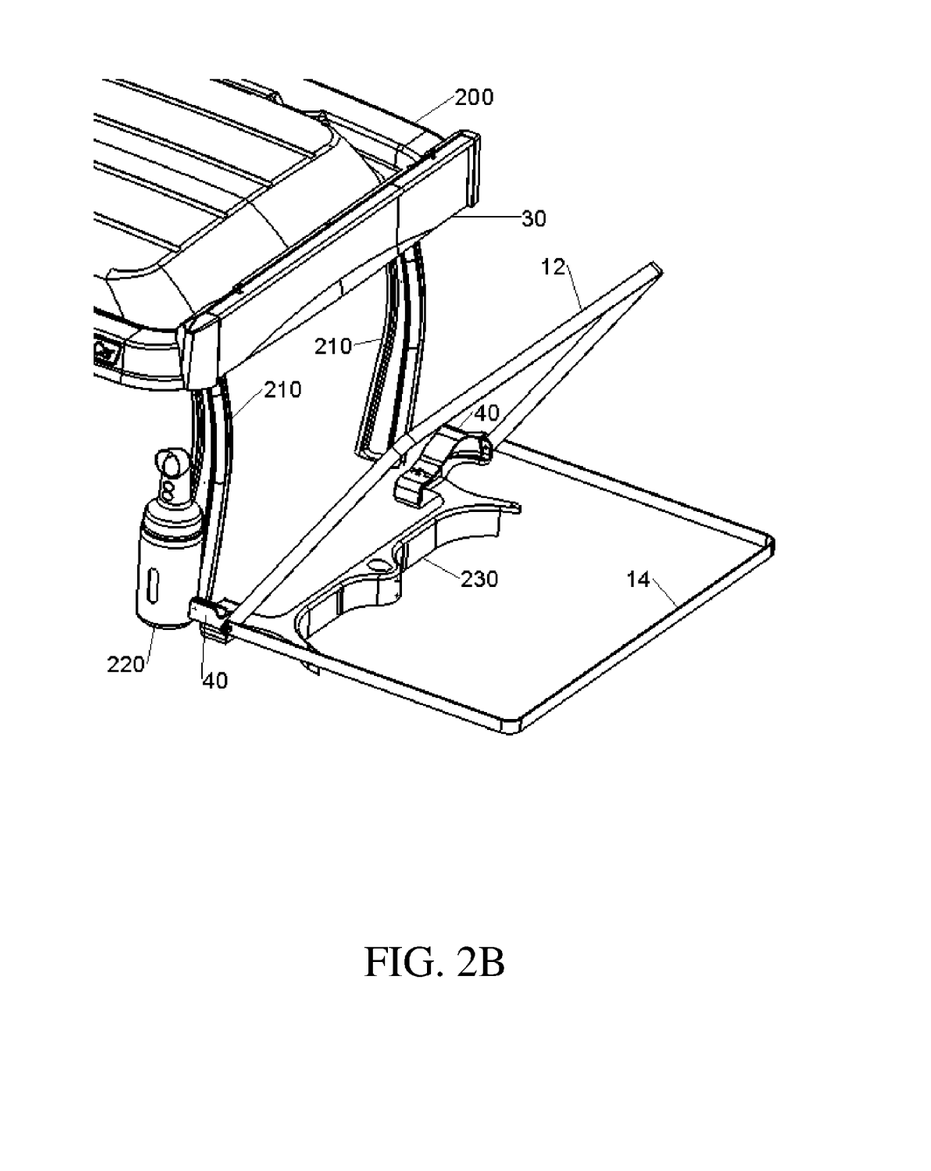
FIG. 2B is another perspective view of a golf-cart frame securely attached on a golf-cart.

FIG. 2A and FIG. 2B, illustrate perspective views of the golf-cart frame attached to the golf-bag holder of a golf-cart. The views shown in FIG. 2A and FIG. 2B provide the understanding that golf-cart cover assembly 20 will fit a cart regardless of the orientation of the structure of the golf-bag holder. Moveable frame arms 12 and 14 support cloth-like cover 25 and provide its form. Moveable frame arms 12 and 14 are generally U-shaped so that each arm has a bottom of the U section of each frame arm and two extending arm sections. At the end of each of the extending arm sections are apertures providing for arms 12 and 14 to be rotably attached to brackets 40 that, in turn, are attached to each side of the golf-bag holder. The rotable attachment of arms 12 and 14 to brackets 40 provides the pivot points for the opening and closing movement of arms 12 and 14. In this example, the rotable attachment comprises friction hinges providing for easy movement of and secure positioning of arms 12 and 14. Illustrated in these figures is an accessory 220, which in this example is a feed and fan container. Golf-cart cover assembly 20 is shaped so that it does not interfere with any of the typical accessories found on a golf-cart.

Figure 3A:
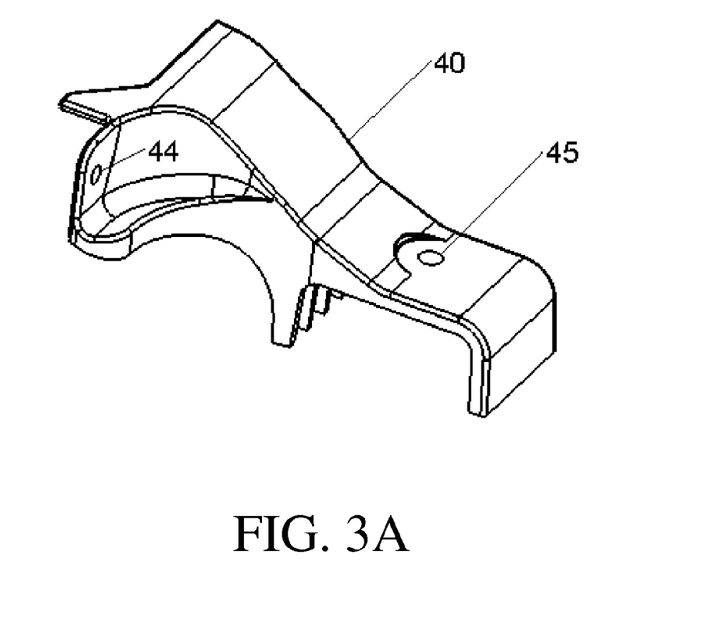
FIG. 3A is a perspective view of a bracket to which the frame arms will be attached and which is to be attached to the golf-cart.

FIG. 3A, a perspective view, illustrates one of the two mirror-image brackets 40 that are attached to the cart and to which the frame arms are attached using a bolt in aperture 44. One of these brackets is formed to be installed on the driver's side of the cart and the other bracket, being a mirror image of the first, is formed to be installed on the passenger side of the cart. Each bracket 40 is provided with two apertures, aperture 44 and aperture 45. In the following figures, how aperture 45 is used to attach the bracket to the cart will be described.

Figure 3B:
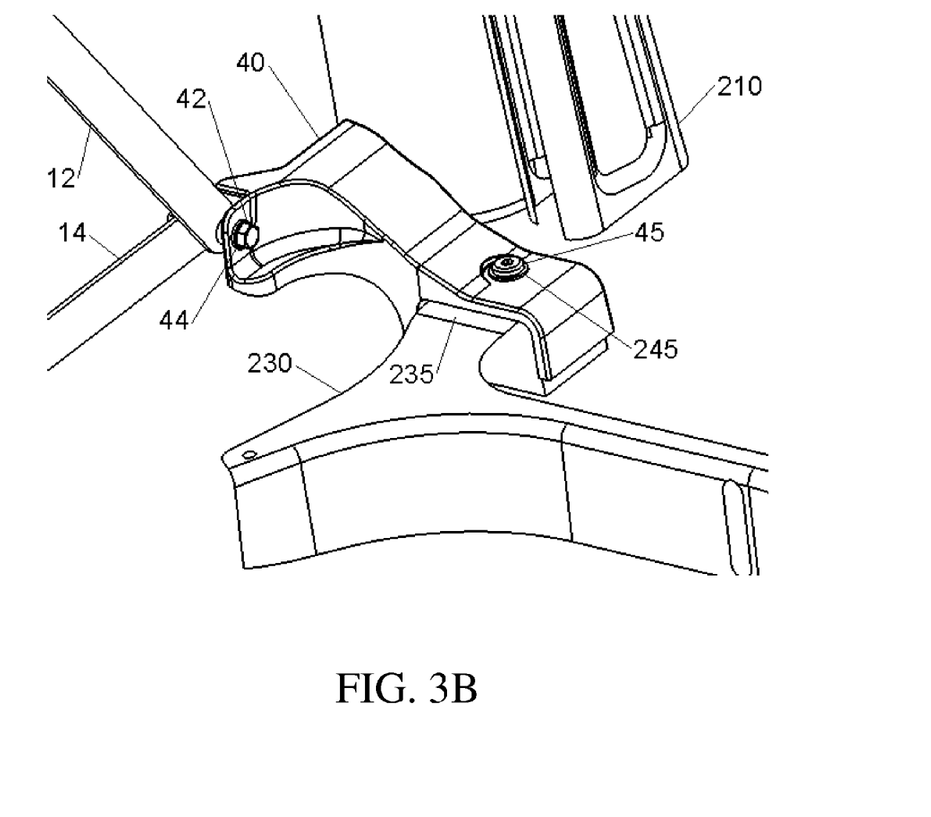
FIG. 3B is a perspective view of the bracket, as illustrated in FIG. 3A, attached to a golf cart and to the frame arms of the cover of the present invention.

FIG. 3B is a perspective view of the bracket, as illustrated in FIG. 3A, attached to the golf-bag support structure of a golf-cart. The apertured ends of arms 12 and 14 are used to attach the arms to brackets 40 using bolt 42 that is provided with the golf-cart cover assembly 20. Golf-cart golf-bag support structure 230 is formed having projecting part 235 that was previously attached to the golf-cart using bolt 245. To attach a bracket 40 to the cart, bolt 245 is temporarily removed to position aperture 45 of the bracket over the bolt hole from which bolt 245 was removed. Once the bracket is positioned, bolt 245 is inserted through bracket aperture 45 and then into the bolt-hole from which it was removed. This procedure takes only a few minutes, no special tools and no additional parts are required, and the cart does not have to be altered in any way. Thus, golf-cart cover assembly 20 is secured to the golf-cart without having to drill any holes in the cart.

Figure 3C:
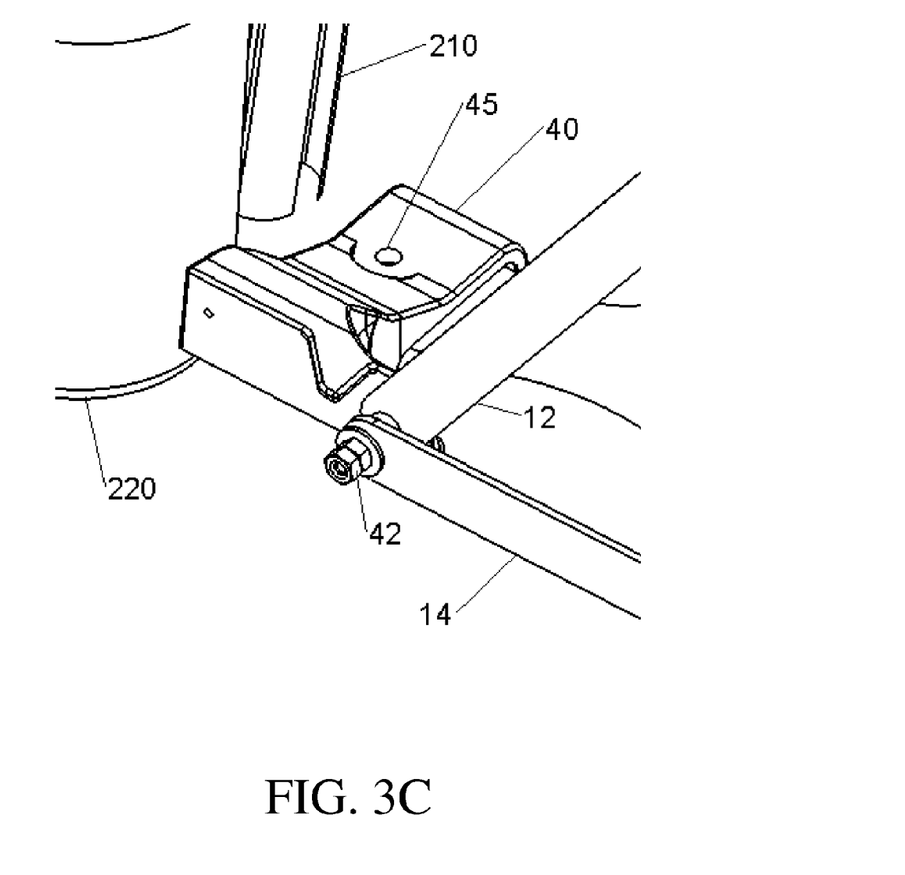
FIG. 3C is another perspective view of the bracket, as illustrated in FIG. 3A, attached to a golf cart and to the frame arms of the cover of the present invention.
Figure 3D:
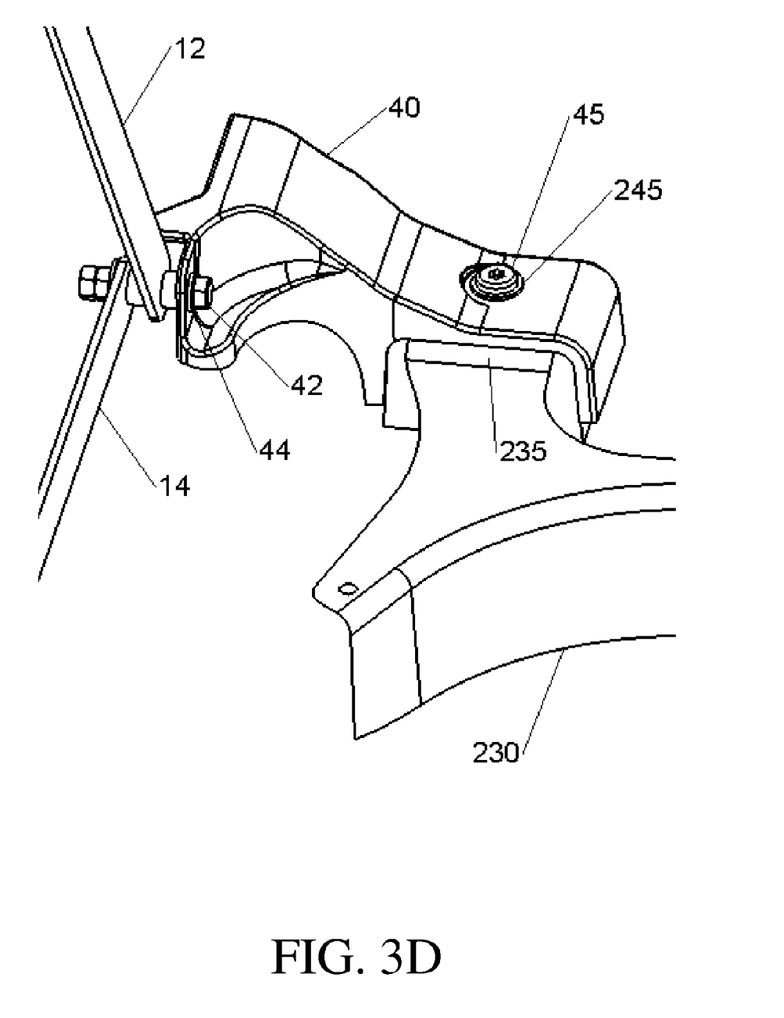
FIG. 3D is yet another perspective view of the bracket, as illustrated in FIG. 3A, attached to a golf cart and to the frame arms of the cover of the present invention.

FIG. 3C, another side perspective view taken from the outside of the cart, illustrates the rotable connection of frame arms 12 and 14 to bracket 40. FIG. 3D, yet another perspective view of bracket 40, shows the relationship of frame arms 12 and 14 to bolt 42 as it attaches them to bracket 40 and the relationship of bolt 42 to bracket 40 when moveable arms are attached to a golf cart. To provide for the friction for the friction hinge there is a spacer positioned about bolt 42 between frame arm 12 and bracket 40, a spacer positioned between frame arm 12 and 14, and a spacer between frame arm 14 and the end nut that secures the frame arms on bolt 42.

Figure 4A:
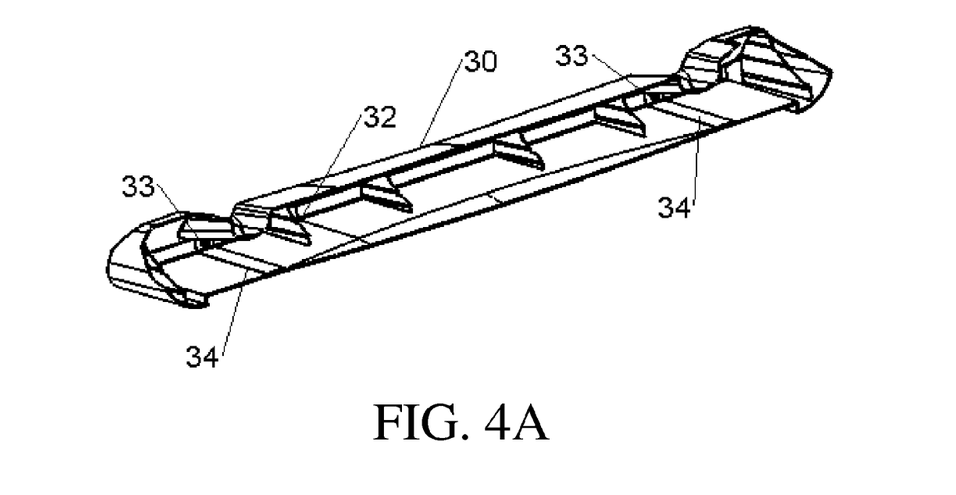
FIG. 4A is a perspective view of the underside of a molded cap of the present invention.

FIG. 4A, a perspective view, illustrates one design of the underside of molded cap 30 of the present invention. In this example, molded cap 30 is molded to mirror the structure of the cart with which it will be used. During the molding process ribs 32 are also produced to provide added cap strength. Clips 34, in this example, are metal clips used to reinforce the secure hold of cap 30 to the roof.

Figure 4B:
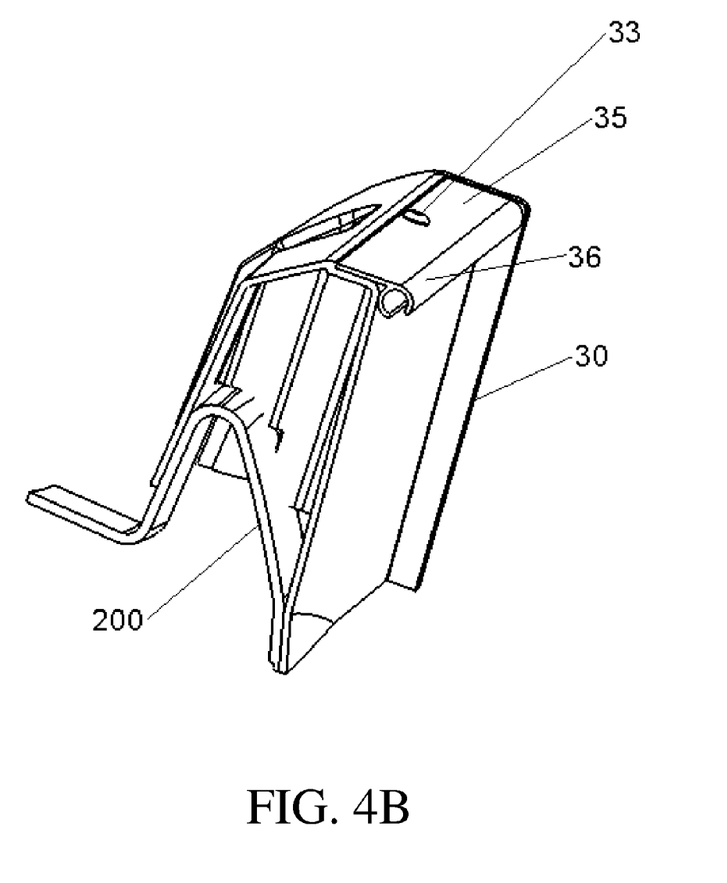
FIG. 4B is a perspective, cross-sectional view of a side of a molded cap of the present invention securely positioned over the rear portion of a cart roof.

FIG. 4B, a perspective cross-sectional view of the molded cap, illustrates molded cap 30 of the present invention securely positioned onto a receiving section of the rear portion of a cart roof 200. This cross-sectional view shows track-bar-rod-holding fixture 36 that is part of molded cap 30. One end of cover 25 is attached to cap 30 using track-bar-rod-holding fixture 36 by inserting a rod that is attached to that end of cover 25 into the rod holding space of fixture 36. Topmost part 35 of cap 30 is flat-shaped and tilted to ensure that no rain water will collect on its surface, but will drain off of the sloping surface onto the slope of the cloth-like cover and onto the ground.

Thus, it has been shown how to make and use the present invention and the many features it provides, such as its easy installation that consists of only two steps and requires no alteration of the cart onto which it is being attached.

What is claimed is:

1. An enclosure assembly for a cargo compartment of an open-air cart, said assembly (20) having:
   a cap (30) with its inside surface a reverse-image of the width of the outside surface of a protruding upwards rear section of a roof (200) of a cart, said cap mate-able with the protruding rear section of the roof (200), said cap extending a distance above the top surface of the cart's roof when so mated;
   brackets (40) for attachment to the cart using the cart's existing structure,
   a cover (25) structured for attachment to said cap (30), said cap 30 structured for receiving said cover (25) for detachable attachment of said cover to said cap,
   rotatable U-shaped frame arms (12 and 14) to support and give form to said cover (25),
   so that when
   one bracket (40) is attached to one side of the cart and another bracket (40) is attached to an opposing side of the cart,
   each of said arms (12 and 14) is attached to said cover (25),
   one end of each of said arms is attached to one of said brackets (40) and the other end of each of said arms is attached to the other of said brackets (40) said assembly (20) is formed and ready for installation on the cart which is achieved when said cap (30) is positioned over the top rear surface section of the roof providing for a two-step installation without altering or drilling any holes in the cart.

2. The enclosure assembly, as recited in claim 1 further comprising sleeves 16 on the underside of said cover (25) for the purpose of attaching said frame arms (12 and 14) to an underside of said cover.

3. The enclosure assembly, as recited in claim 2, wherein each end of each of said frame arms (12 and 14) have a bolt accepting aperture.

4. The enclosure assembly, as recited in claim 3, wherein said first end of each of said frame arms (12 and 14) is pivotably attachable to one of said brackets (40) and said second end of each of said frame arms (12 and 14) is pivotably attachable to another of said brackets (40).

5. The enclosure assembly, as recited in claim 4, wherein said first end of each of said frame arms (12 and 14) is pivotably attachable to one of said brackets (40) via a friction hinge bolt and said second end of each of said frame arms (12 and 14) is pivotably attachable to another of said brackets (40) via another friction hinge bolt to said brackets (40).

6. The enclosure assembly, as recited in claim 1, wherein said cap (30) has a top surface that extends above the top surface of the cart's roof (200) which is the distance required accommodate long-handled golf-clubs placed upright in their golf.

7. The enclosure assembly, as recited in claim 1, wherein said cap (30) and a part of said cover (25) attached to said cap (30) are sloped providing for water to drain off of said cap and said cover.

8. A method of making an enclosure assembly for a cargo compartment of an open-air cart, making said assembly (20) including the steps:
  providing a cap (30) with its inside surface a reverse-image of the width of the outside surface of a protruding upwards rear section of the roof (200) of said cart said cap mate-able with the protruding a rear section of the roof (200), said cap extending a distance above the top surface of the cart's roof when so mated;
  providing brackets (40) for attachment to the cart using the cart's existing structure,
  providing a cover (25) structured for attachment to said cap (30), said cap 30 structured for receiving said cover (25) for detachable attachment of said cover to said cap,
  providing rotatable U-shaped frame arms (12 and 14) to support and give form to said cover (25);
  attaching one bracket (40) to one side of the cart and attaching another bracket (40) to an opposing side of the cart;
  attaching each of said arms (12 and 14) to said cover (25),
  attaching one end of each of said arms to one of said brackets (40) and attaching the other end of each of said arms to the other of said brackets (40) thus
forming said assembly (20) ready for installation on the cart which is achieved when said cap (30) is positioned over the top rear surface section of the roof, providing for a two-step installation without altering or drilling any holes in the cart.

9. The method, as recited in claim 8, further comprising attaching said rotatable U-shaped frame arms (12 and 14) structured for detachable attachment to said cover (25) and for attachment to said brackets (40).

10. The method, as recited in claim 9, further comprising attaching sleeves 16 on the underside of said cover (25) for the purpose of attaching said frame arms (12 and 14) to an underside of said cover.

11. The method, as recited in claim 10, providing for each end of each of said frame arms (12 and 14) have a bolt accepting aperture.

12. The method, as recited in claim 11, pivotably attaching said first end of each of said frame arms (12 and 14) to one of said brackets (40) via a friction hinge bolt and pivotably attaching said second end of each of said frame arms (12 and 14) to another of said brackets (40) via another friction hinge bolt to said brackets (40).

13. The method, as recited in claim 8, providing said cap (30) with a top surface that extends above the top surface of the cart's roof (200) the distance required accommodate long-handled golf-clubs placed upright in their golf bag.

14. The method, as recited in claim 8, providing said cap (30) and a part of said cover (25) attached to said cap (30) with a slope providing for water to drain off of said cap and said cover.

15. An enclosure assembly, comprising:
  a golf-cart golf-club-compartment cover assembly (20) providing for a two-step installation of said cover assembly (20) including,
    a cap (30) structured to form a mating connection with the width of the outside surface of a rear portion of a golf-cart roof,
    a flexible cover (25) structured for attachment to said cap (30),
    a first bracket (40) and a second bracket (40), said brackets reverse mirror-images of each other and structured for attachment to the golf-cart,
    a first moveable U-shaped frame arm (12) and a second moveable U-shaped frame arm (14),
  said frame arms each having a first and second end,
  said first end of each of said frame arms (12 and 14) pivotably attachable to said first bracket (40) and said second end of each of said frame arms (12 and 14) attachable to said second bracket (40),
  said first and second brackets structured to act as friction hinges for the easy and secure movement of said frame arms,
  said frame arms (12 and 14) attachable to said flexible cover (25),
so that when said frame arms (12 and 14) are attached to said flexible cover (25) and said cover (25) is attached to said cap (30), said assembly (20) may be installed to the cart by having said cap (30) positioned over the rear section of the cart's roof and having said brackets (40) attached to said cart using only attachments that exist on said cart, providing for a two-step installation to be achieved without altering or drilling any holes in the cart.

16. The enclosure assembly, as recited in claim 15, wherein said first end of each of said frame arms (12 and 14) is pivotably detachably attached to one of said brackets (40) via a friction hinge bolt and said second end of each of said frame arms (12 and 14) is pivotably attached to another of said brackets (40) via another friction hinge bolt to said brackets (40).

\* \* \* \* \*